(12) United States Patent
Shioya et al.

(10) Patent No.: US 10,907,496 B2
(45) Date of Patent: Feb. 2, 2021

(54) TURBOCHARGER

(71) Applicant: IHI Corporation, Koto-ku (JP)

(72) Inventors: Takayuki Shioya, Tokyo (JP); Akira Iwakami, Tokyo (JP); Satoshi Shimoda, Tokyo (JP); Takafumi Ueda, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/179,328

(22) Filed: Nov. 2, 2018

(65) Prior Publication Data

US 2019/0071987 A1 Mar. 7, 2019

Related U.S. Application Data

(63) Continuation of application No. PCT/JP2017/017337, filed on May 8, 2017.

(30) Foreign Application Priority Data

May 27, 2016 (JP) .................. 2016-106097

(51) Int. Cl.
*F01D 17/16* (2006.01)
*F02B 37/24* (2006.01)
*F02B 39/00* (2006.01)
*F01D 9/04* (2006.01)
(Continued)

(52) U.S. Cl.
CPC ........... *F01D 17/165* (2013.01); *F01D 9/041* (2013.01); *F02B 37/24* (2013.01); *F02B 39/00* (2013.01); *F01D 9/045* (2013.01); *F01D 25/162* (2013.01); *F01D 25/246* (2013.01); *F05D 2220/40* (2013.01); *Y02T 10/12* (2013.01)

(58) Field of Classification Search
None
See application file for complete search history.

(56) References Cited

U.S. PATENT DOCUMENTS 4,770,603 A * 9/1988 Engels .................. F01D 5/141
 415/147
6,739,134 B2 * 5/2004 Fledersbacher ....... F02B 37/025
 60/602

(Continued)

FOREIGN PATENT DOCUMENTS

CN 2353898 Y 12/1999
CN 101012772 8/2007
(Continued)

OTHER PUBLICATIONS

International Preliminary Report on Patentability and Written Opinion dated Dec. 6, 2018 in PCT/JP2017/017337 (English Translation only), 7 pages.

(Continued)

*Primary Examiner* — Igor Kershteyn
*Assistant Examiner* — Juan G Flores
(74) *Attorney, Agent, or Firm* — Oblon, McClelland, Maier & Neustadt, L.L.P.

(57) ABSTRACT

A turbocharger includes: a nozzle drive mechanism for driving a plurality of nozzle vanes; and a support ring for holding the nozzle drive mechanism, the support ring having a main body portion having a heat shielding portion facing a turbine impeller in a direction of a rotational axis of the turbine impeller.

2 Claims, 6 Drawing Sheets

(51) Int. Cl.
F01D 25/16 (2006.01)
F01D 25/24 (2006.01)

(56) References Cited

U.S. PATENT DOCUMENTS

| | | | | |
|---|---|---|---|---|
| 7,121,788 | B2* | 10/2006 | Daudel | F01D 17/165 |
| | | | | 415/159 |
| 9,664,060 | B2* | 5/2017 | Inoue | F01D 17/16 |
| 2007/0175216 | A1* | 8/2007 | Kobayashi | F01D 17/165 |
| | | | | 60/605.2 |
| 2010/0296925 | A1 | 11/2010 | Sakai | |
| 2012/0237343 | A1* | 9/2012 | Matsuyama | F02C 7/28 |
| | | | | 415/182.1 |
| 2015/0125275 | A1* | 5/2015 | Ueda | F01D 17/165 |
| | | | | 415/158 |
| 2016/0258316 | A1 | 9/2016 | Ueda et al. | |

FOREIGN PATENT DOCUMENTS

| | | | |
|---|---|---|---|
| CN | 104204450 A | | 12/2014 |
| EP | 1 816 317 A2 | | 8/2007 |
| JP | 46-012407 | | 4/1971 |
| JP | 62-145948 U | | 9/1987 |
| JP | 63-118338 | | 7/1988 |
| JP | 2001-173450 | | 6/2001 |
| JP | 2007-187015 | | 7/2007 |
| JP | 2007-231934 | | 9/2007 |
| JP | 2009-002246 | | 1/2009 |
| JP | 2009002246 A | * | 1/2009 |
| JP | 2009-167971 | | 7/2009 |
| JP | 2009-529620 A | | 8/2009 |
| JP | 2010-053773 | | 3/2010 |
| JP | 2010-053793 | | 3/2010 |
| JP | 2010-071142 | | 4/2010 |
| JP | 2010-096110 | | 4/2010 |
| JP | 2010071142 A | * | 4/2010 |
| JP | 4661598 | | 3/2011 |
| JP | 2011-252439 | | 12/2011 |
| JP | 2012-062808 | | 3/2012 |
| JP | 5181932 | | 4/2013 |
| JP | 5206307 | | 6/2013 |
| JP | 2013-231404 | | 11/2013 |
| JP | 2015-140739 | | 8/2015 |
| JP | 2015-194092 | | 11/2015 |
| JP | 2016-008575 | | 1/2016 |
| KR | 10-2007-0079566 | | 8/2007 |
| WO | WO 01/046575 A1 | | 6/2001 |
| WO | WO 2016/039015 A1 | | 3/2016 |

OTHER PUBLICATIONS

International Search Report dated May 30, 2017 in PCT/JP2017/017337 filed May 8, 2017 (with English Translation).
Written Opinion dated May 30, 2017 in PCT/JP2017/017337 filed May 8, 2017.
Japanese Office Action dated Mar. 17, 2020, in Patent Application No. 2018-519170, 6 pages (with English translation).
Combined Chinese Office Action and Search Report dated Mar. 26, 2020, in Patent Application No. 201780027707.3 (with English translation), 12 pages.

* cited by examiner

TURBOCHARGER

CROSS REFERENCE TO RELATED APPLICATIONS

This application is a continuation application of International Application No. PCT/JP2017/017337, filed on May 8, 2017, which claims priority to Japanese Patent Application No. 2016-106097, filed on May 27, 2016, the entire contents of which are incorporated by reference herein.

BACKGROUND ART

Technical Field

The present disclosure relates to a turbocharger including a nozzle drive mechanism for driving a plurality of nozzle vanes.

Related Art

Conventionally, turbochargers of a variable-capacity type are widely used. In such a turbocharger, for example as illustrated in Patent Literature 1, a plurality of nozzle vanes are arranged while annularly aligned in a flow passage for guiding exhaust gas from a turbine scroll flow passage to a turbine impeller. The nozzle vanes are attached to a bladed shaft. When the bladed shaft rotates by the power of an actuator, the angle of the nozzle vanes change in the flow passage as the bladed shaft rotates. The flow passage width (so-called nozzle throat width) changes, and thereby the flow rate of exhaust gas flowing through the flow passage is controlled.

In addition, in Patent Literature 1, a heat shielding plate is provided between a turbine housing and a bearing housing. The turbine housing accommodates the turbine impeller. The bearing housing accommodates a bearing. The heat shielding plate suppresses heat transfer from the turbine impeller side to the bearing side.

CITATION LIST

Patent Literature

Patent Literature 1: Japanese Patent Application Laid-Open No. 2015-140739

SUMMARY

Technical Problem

In the turbocharger of the variable-capacity type described above, the number of parts for changing the angle of the nozzle vanes is large. Therefore, assembling work is complicated. In a case where a heat shielding plate is provided to the bearing housing, the number of parts and assembling work further increase. Providing a heat shielding plate in the bearing housing results in as a factor that deteriorates the workability of assembly.

Therefore, an object of the present disclosure is to provide a turbocharger capable of improving workability of assembly.

Solution to Problem

In order to solve the above problem, a turbocharger according to one aspect of the present disclosure includes: a nozzle drive mechanism for driving a plurality of nozzle vanes; and a support ring for holding the nozzle drive mechanism, the support ring having a heat shielding portion facing a turbine impeller in a direction of a rotational axis of the turbine impeller.

The support ring may protrude outward in a radial direction of the support ring and may have a clamped portion that is clamped between a turbine housing and a bearing housing.

In order to solve the above problem, another turbocharger according to one aspect of the present disclosure includes: a nozzle drive mechanism for driving a plurality of nozzle vanes; a support ring having a main body portion for holding the nozzle drive mechanism and a clamped portion protruding radially outward from the main body portion and clamed between a turbine housing and a bearing housing; and a heat shielding plate, an inner diameter end portion of which facing a rear surface of a turbine impeller and an outer diameter end portion of which extending to a position facing the clamped portion, the heat shielding plate clamped between the turbine housing and the bearing housing.

Effects of Disclosure

According to the present disclosure, workability of assembly can be improved.

DESCRIPTION OF EMBODIMENTS

Embodiments of the present disclosure will be described in detail below with reference to the accompanying drawings. Dimensions, materials, other specific numerical values, and the like illustrated in embodiments are merely examples for facilitating understanding, and the present disclosure is not limited thereby except for a case where it is specifically mentioned. Note that, in the present specification and the drawings, components having substantially the same function and structure are denoted by the same symbol, and redundant explanations are omitted. Components not directly related to the present disclosure are not illustrated.

Figure 1:
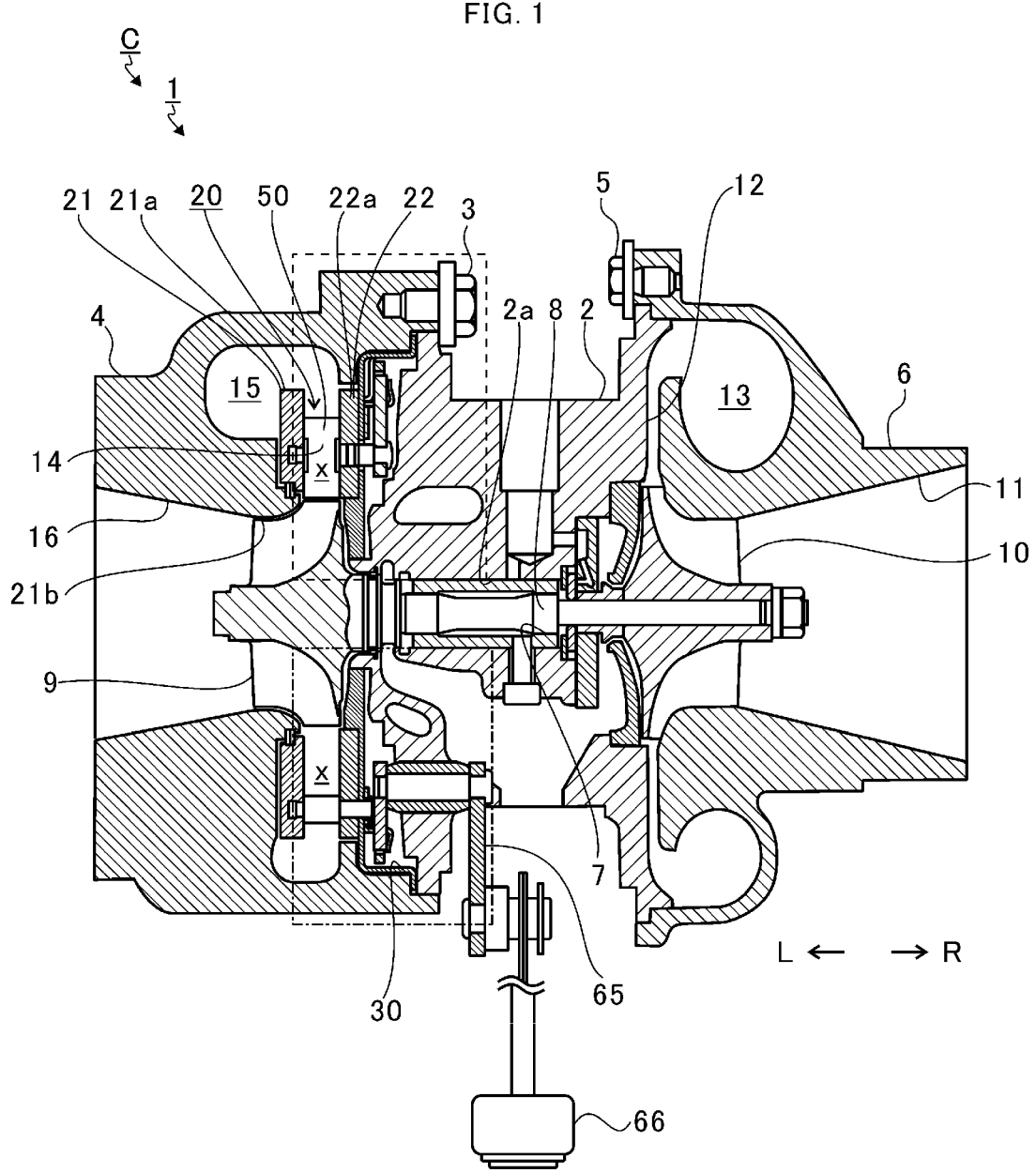
FIG. 1 is a schematic cross-sectional view of a turbocharger.

FIG. 1 is a schematic cross-sectional view of a turbocharger C. Hereinafter, descriptions are given assuming that a direction of an arrow L illustrated in FIG. 1 is the left side of the turbocharger C. Descriptions are given assuming that a direction of an arrow R illustrated in FIG. 1 is the right side of the turbocharger C. As illustrated in FIG. 1, the turbocharger C includes a turbocharger main body 1. The turbocharger main body 1 includes a bearing housing 2. A turbine housing 4 is connected to the left side of the bearing housing 2 by a fastening bolt 3. A compressor housing 6 is connected to the right side of the bearing housing 2 by a fastening bolt 5. The bearing housing 2, the turbine housing 4, and the compressor housing 6 are integrated.

A receiving hole 2a is formed in the bearing housing 2. The receiving hole 2a penetrates through the turbocharger C in the left-right direction. A shaft 8 is pivotally supported in a freely rotatable manner by a radial bearing 7 (a semi-floating bearing is illustrated in FIG. 1 as an example in this embodiment) accommodated in the receiving hole 2a. At a left end portion of the shaft 8, a turbine impeller 9 is provided. The turbine impeller 9 is accommodated in the turbine housing 4 in a freely rotatable manner. Furthermore, a compressor impeller 10 is provided at a right end portion of the shaft 8. The compressor impeller 10 is accommodated in the compressor housing 6 in a freely rotatable manner.

An intake port 11 is formed in the compressor housing 6. The intake port 11 opens to the right side of the turbocharger C. The intake port 11 is connected to an air cleaner (not illustrated). Furthermore, in the state where the bearing housing 2 and the compressor housing 6 are connected by the fastening bolt 5, a diffuser flow passage 12 is formed. The diffuser flow passage 12 is formed by opposing surfaces of the bearing housing 2 and the compressor housing 6. The diffuser flow passage 12 pressurizes the air. The diffuser flow passage 12 is annularly formed outward from an inner side in a radial direction of the shaft 8. The diffuser flow passage 12 communicates with the intake port 11 via the compressor impeller 10 on an inner side in the radial direction of the shaft 8.

Furthermore, the compressor housing 6 includes a compressor scroll flow passage 13. The compressor scroll flow passage 13 is annular. The compressor scroll flow passage 13 is positioned on an outer side in the radial direction of the shaft 8 with respect to the diffuser flow passage 12. The compressor scroll flow passage 13 communicates with an intake port of an engine (not illustrated). The compressor scroll flow passage 13 also communicates with the diffuser flow passage 12. When the compressor impeller 10 rotates, therefore, the air is sucked into the compressor housing 6 from the intake port 11. The sucked air is accelerated and pressurized in the process of flowing through blades of the compressor impeller 10. The accelerated and pressurized air is further pressurized (recovered of the pressure) by the diffuser flow passage 12 and the compressor scroll flow passage 13. The pressurized air is guided to the engine.

In the state where the bearing housing 2 and the turbine housing 4 are connected by the fastening bolt 3, a clearance 14 is formed between opposing surfaces of the bearing housing 2 and the turbine housing 4. The clearance 14 is a portion in which a flow passage x, in which nozzle vanes 62 that will be described later are arranged and through which exhaust gas flows, is formed. The flow passage x is annularly formed outward from an inner side in the radial direction of the shaft 8 (turbine impeller 9).

An exhaust port 16 is formed in the turbine housing 4. The exhaust port 16 communicates with a turbine scroll flow passage 15 via the turbine impeller 9. The exhaust port 16 faces a front surface of the turbine impeller 9. The exhaust port 16 is connected to an exhaust gas purification device (not illustrated).

The turbine scroll flow passage 15 communicates with a gas inlet port (not illustrated). Exhaust gas discharged from the engine is guided to the gas inlet port. The turbine scroll flow passage 15 communicates also with the flow passage x. Therefore, exhaust gas guided from the gas inlet port to the turbine scroll flow passage 15 is guided to the exhaust port 16 via the flow passage x and the turbine impeller 9. That is, the flow passage x extends from the turbine scroll flow passage 15 toward the turbine impeller 9. The exhaust gas rotates the turbine impeller 9 in the process of flowing therethrough. The turning force of the turbine impeller 9 is further transmitted to the compressor impeller 10 via the shaft 8. The turning force of the compressor impeller 10 causes the air to be pressurized and guided to the intake port of the engine.

At this time, when a flow rate of the exhaust gas guided to the turbine housing 4 changes, the rotation amounts of the turbine impeller 9 and the compressor impeller 10 change. Depending on an operation status of the engine, there may be a case where the air pressurized to a desired pressure cannot be sufficiently guided to the intake port of the engine. Therefore, the turbocharger C includes a nozzle drive mechanism 20.

The nozzle drive mechanism 20 changes the width (nozzle throat width which will be described later) of the flow passage x of the turbine housing 4. The nozzle drive mechanism 20 changes the flow velocity of exhaust gas guided to the turbine impeller 9 depending on the flow rate of the exhaust gas. Specifically, in a case where the rotational speed of the engine is low and the flow rate of exhaust gas is small, the nozzle drive mechanism 20 reduces the degree of opening of the flow passage x to increase the flow velocity of exhaust gas guided to the turbine impeller 9. In this manner, the nozzle drive mechanism 20 can cause the turbine impeller 9 to rotate even with a small flow rate. A configuration of the nozzle drive mechanism 20 will be described below.

The nozzle drive mechanism 20 includes a shroud ring 21 and a nozzle ring 22. The shroud ring 21 is provided on the turbine housing 4 side. The nozzle ring 22 is provided on the bearing housing 2 side while facing the shroud ring 21. The flow passage x is partitioned by the shroud ring 21 and the nozzle ring 22.

The shroud ring 21 has a main body portion 21a. The main body portion 21a has a thin plate ring shape. The nozzle ring 22 has a main body portion 22a. For example, the main body portion 22a has a thin plate ring shape. The main body portion 22a has a diameter equivalent to that of the main body portion 21a of the shroud ring 21. The nozzle ring 22 is arranged opposed to the shroud ring 21 with a predetermined space therebetween.

Figure 2A:
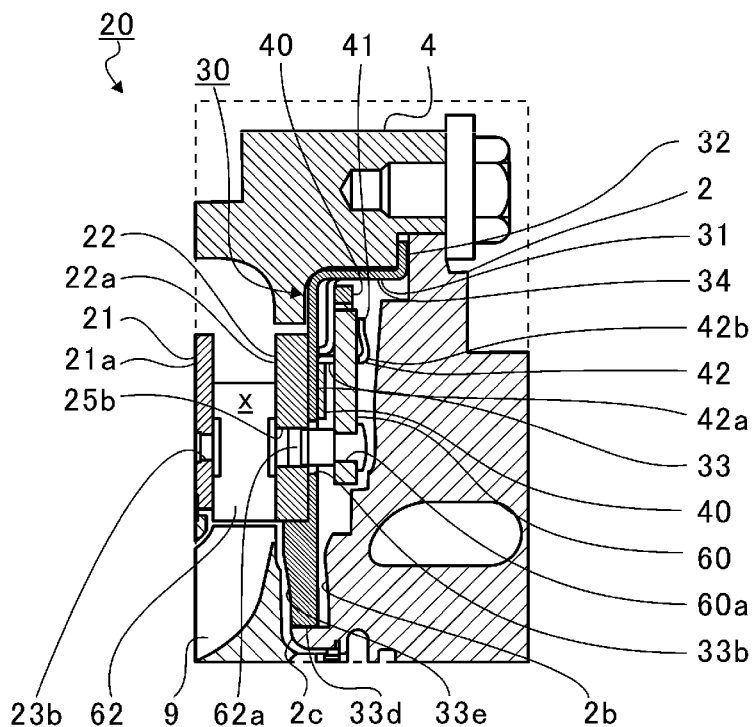
FIG. 2A is an extracted diagram of a broken line part in an upper part of FIG. 1.
Figure 2B:
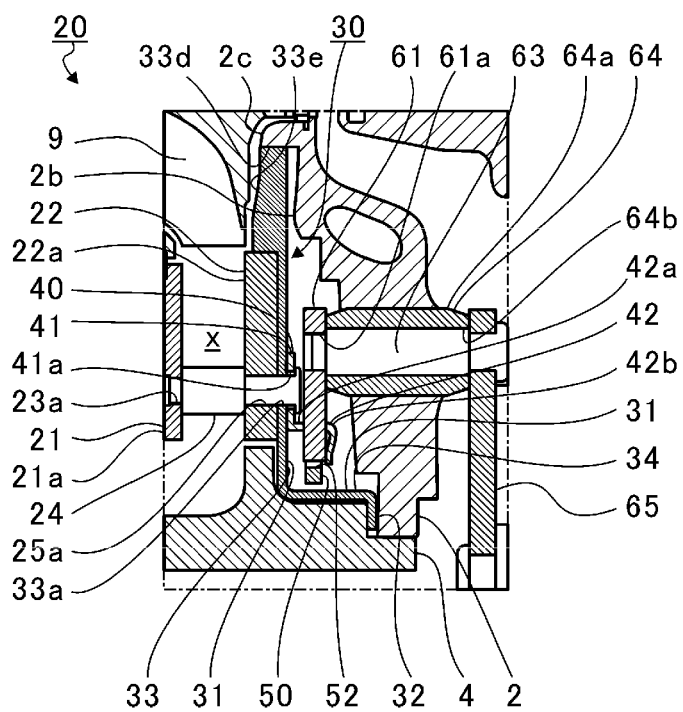
FIG. 2B is an extracted diagram of a one-dot chain line part in a lower part of FIG. 1.

FIG. 2A is an extracted diagram of a broken line part in an upper part of FIG. 1. FIG. 2B is an extracted diagram of a one-dot chain line part in a lower part of FIG. 1. As illustrated in FIG. 2B, a pin shaft hole 23a is provided on a surface of the main body portion 21a of the shroud ring 21 that faces the nozzle ring 22. A plurality of pin shaft holes 23a is formed at equal intervals in the circumferential direction (three in the present embodiment, but only one is illustrated in FIG. 2B).

Moreover, a pin shaft through hole 25a is formed in the main body portion 22a of the nozzle ring 22. The pin shaft through hole 25a penetrates through the main body portion 22a in the thickness direction (axial direction of the shaft 8). Multiple pin shaft through holes 25a are formed at equal intervals in the circumferential direction (three in the present embodiment, only one is illustrated in FIG. 2B). The pin shaft holes 23a formed in the shroud ring 21 face the pin shaft through holes 25a formed in the nozzle ring 22. A connecting pin 24 is inserted through a pin shaft hole 23a and a pin shaft through hole 25a.

Specifically, as illustrated in FIG. 2B, one end of a connecting pin 24 is inserted through a pin shaft through hole 25a of the nozzle ring 22. The other end of the connecting pin 24 is inserted into a pin shaft hole 23a of the shroud ring 21. Multiple connecting pins 24 (three in this embodiment, only one is illustrated in FIG. 2B) are arranged while spaced apart at equal intervals in the circumferential direction. The connecting pins 24 keep the facing interval from the shroud ring 21 constant.

Furthermore, one end of a connecting pin 24 inserted through the pin shaft through hole 25a of the nozzle ring 22 protrudes to the right side of the nozzle ring 22. The protruding portion of the connecting pin 24 is caulked. In this manner, a support ring 30 and a guide ring 40 are attached to the right side of the nozzle ring 22. The support ring 30 has a main body portion 31. The main body portion 31 has a bottomed cylindrical shape. The support ring 30 has a cross-sectional shape in which a member having a thin plate shape is bent (see FIG. 1).

Figure 3:
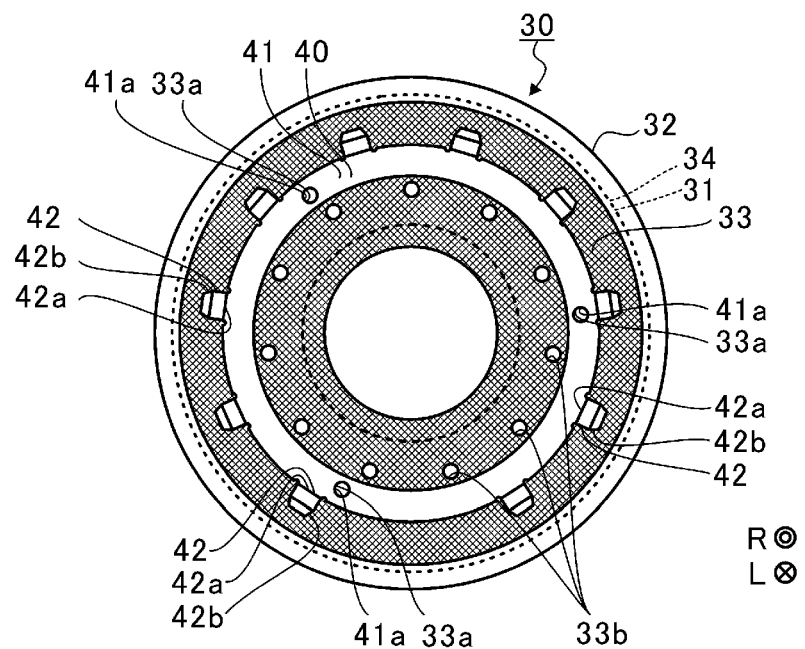
FIG. 3 is a plan view of a support ring and a guide ring.

FIG. 3 is a plan view of the support ring 30 and the guide ring 40. In FIG. 3, the front side of the drawing faces the right side of FIGS. 2A and 2B. In FIG. 3, the rear side of the drawing faces the left side of FIGS. 2A and 2B. As illustrated in FIGS. 2A and 2B, the support ring 30 includes the main body portion 31 and a flange portion 32 (clamped portion). The flange portion 32 is annular. The flange portion 32 is bent radially outward from the right end portion (end portion on the front side in FIG. 3) of the main body portion 31. Meanwhile, the main body portion 31 includes a bottom surface portion 33 (indicated by cross hatching in FIG. 3) and a cylindrical portion 34. The bottom surface portion 33 extends in the radial direction. The cylindrical portion 34 is bent from the outer circumferential edge of the bottom surface portion 33 toward the flange portion 32. That is, the bottom surface portion 33 is bent inward in the radial direction from the left end portion (end portion on the rear side in FIG. 3) of the cylindrical portion 34.

Moreover, the flange portion 32 is clamped between the bearing housing 2 and the turbine housing 4 as illustrated in FIGS. 2A and 2B. In the above state, the fastening bolt 3 fastens the bearing housing 2 and the turbine housing 4, thereby holding the support ring 30 in the turbine housing 4. By holding the support ring 30 in the turbine housing 4, whole of the nozzle drive mechanism 20 is held inside the turbine housing 4.

The guide ring 40 has a main body portion 41 which is annular. An inner diameter of the main body portion 41 of the guide ring 40 is roughly equal to an inner diameter of the bottom surface portion 33 of the support ring 30. The main body portion 41 is arranged on a radially inner side of the cylindrical portion 34 while being in contact with the bottom surface portion 33. In FIG. 3, a part of the bottom surface portion 33 of the support ring 30 is hidden by the guide ring 40.

As illustrated in FIG. 3, ring holes 33a are provided in the bottom surface portion 33 of the support ring 30. One end of a connecting pin 24 described above can be inserted through a ring hole 33a. Three ring holes 33a are provided at equal intervals in the circumferential direction. In addition, three guide holes 41a are provided in the main body portion 41 of the guide ring 40. The guide holes 41a face the ring holes 33a. One end of a connecting pin 24 is inserted through a guide hole 41a. A connecting pin 24 is inserted through a ring hole 33a and a guide hole 41a and caulked. In this manner, the support ring 30, the shroud ring 21, the nozzle ring 22, and the guide ring 40 are connected. That is, the shroud ring 21 and the nozzle ring 22 are held in the turbine housing 4 via the support ring 30.

In addition, through holes 33b are provided on the bottom surface portion 33 on an inner diameter side of the ring holes 33a. The plurality of (eleven in the present embodiment) through holes 33b is provided in the circumferential direction of the support ring 30. One end of a bladed shaft 62a is inserted through a through hole 33b as will be described later.

Furthermore, the main body portion 41 of the guide ring 40 is provided with support pieces 42 as illustrated in FIG. 3. The plurality of support pieces 42 (ten in this embodiment) are provided while spaced apart from each other in the circumferential direction. As illustrated in FIGS. 2A and 2B, a support piece 42 includes a support portion 42a and a fall preventing portion 42b. The support portion 42a is bent from the main body portion 41 to the right side (front side in FIG. 3). The fall preventing portion 42b is bent outward in the radial direction from the support portion 42a. The fall preventing portion 42b faces the main body portion 41 while spaced apart therefrom. A drive ring 50 is freely rotatably supported by the support pieces 42 (see FIG. 4).

Figure 4:
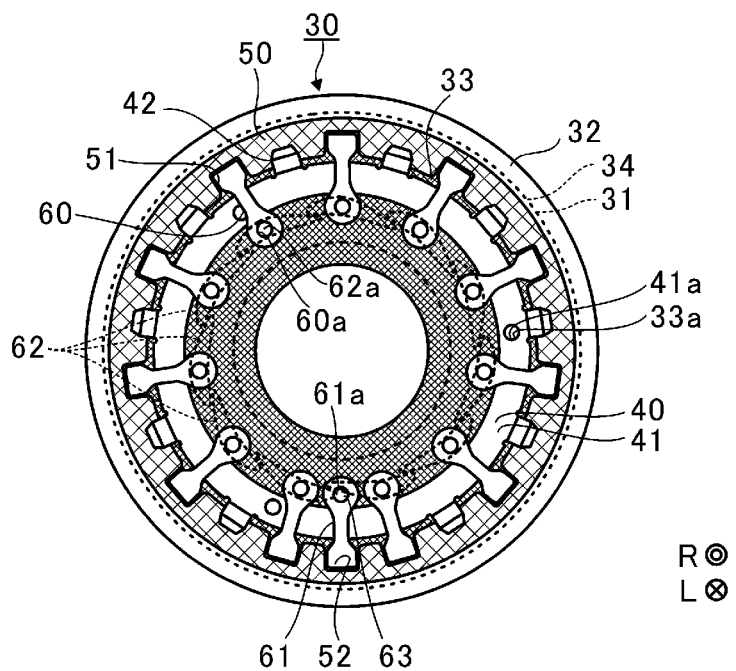
FIG. 4 is a view illustrating a drive ring supported by the guide ring.

FIG. 4 is a view illustrating the drive ring 50 supported by the guide ring 40. In FIG. 4, the bottom surface portion 33 of the support ring 30 is indicated by cross-hatching to facilitate understanding. In FIG. 4, the drive ring 50 is indicated in cross-hatching that is finer than that of the bottom surface portion 33.

The drive ring 50 is formed by an annular thin plate member. The support portions 42a of the support pieces 42 are positioned on a radially inner side of the drive ring 50. The drive ring 50 is freely rotatably supported between the fall preventing portions 42b and the bottom surface portion 33. As illustrated in FIGS. 2A and 4, a plurality of engagement recessed portions 51 is formed in the drive ring 50 in the circumferential direction. An engagement recessed portion 51 is cut out radially outward from an end portion on the inner peripheral side of the drive ring 50. One end of a transmission link 60 is engaged with an engagement recessed portion 51.

As illustrated in FIGS. 2B and 4, a second engagement recessed portion 52 is further formed at the end portion on the inner peripheral side of the drive ring 50. The second engagement recessed portion 52 has a similar shape to that of an engagement recessed portion 51. One end of a link plate 61 is engaged with the second engagement recessed portion 52. The link plate 61 has a similar shape to that of a transmission link 60.

Note that a fitting hole 60a is formed on the other end side of a transmission link 60. A link hole 61a is formed on the other end side of the link plate 61. As illustrated in FIG. 2A, a bladed shaft 62a is attached in the fitting hole 60a while inserted therethrough. The bladed shaft 62a is attached to a nozzle vane 62. As illustrated in FIG. 2B, a drive shaft 63 is fitted in the link hole 61a of the link plate 61.

The bladed shaft 62a is inserted through a bladed shaft hole 23b and a bladed shaft through hole 25b. The bladed shaft 62a is pivotally supported by the bladed shaft hole 23b and the bladed shaft through hole 25b in a freely rotatable manner. The bladed shaft hole 23b is provided on a radially inner side of the pin shaft hole 23a in the main body portion 21a of the shroud ring 21. The bladed shaft hole 23b is provided on a surface of the main body portion 21a that faces the nozzle ring 22. A plurality of bladed shaft holes 23b (eleven in the present embodiment, but only one is illustrated in FIG. 2A) is formed in the circumferential direction of the main body portion 21a. The bladed shaft holes 23b are arranged at equal intervals in the circumferential direction of the main body portion 21a.

Similarly, the bladed shaft through hole 25b is provided on a radially inner side of the pin shaft through hole 25a in the main body portion 22a of the nozzle ring 22. The bladed shaft through hole 25b penetrates through the main body portion 22a in the thickness direction (axial direction of the shaft 8). A plurality of bladed shaft through holes 25b (eleven in the present embodiment, but only one is illustrated in FIG. 2A) is formed in the circumferential direction of the main body portion 22a. The bladed shaft through holes 25b are arranged at equal intervals in the circumferential direction of the main body portion 22a. The bladed shaft holes 23b formed in the shroud ring 21 and the bladed shaft through holes 25b formed in the nozzle ring 22 are arranged while facing each other.

Furthermore, one end of the bladed shaft 62a inserted through the bladed shaft through hole 25b of the nozzle ring 22 protrudes to the right side of the nozzle ring 22. The other end of the bladed shaft 62a is inserted through the fitting hole 60a of the transmission link 60. The protruding portion of the bladed shaft 62a is caulked. The transmission link 60 is attached to the bladed shaft 62a.

In this manner, a plurality of bladed shafts 62a and a plurality of nozzle vanes 62 are annularly arranged in the flow passage x while spaced apart from each other in the rotation direction of the turbine impeller 9. The drive shaft 63 extends to the right side of the drive ring 50 as illustrated in FIG. 2B. The extended portion of the drive shaft 63 is inserted through a bearing 64. To describe in detail, the bearing 64 has a main body portion 64a which is annular. An inner circumferential surface of a bearing hole 64b of the main body portion 64a serves as a bearing surface. The drive shaft 63 is inserted through the bearing hole 64b.

An end of the drive shaft 63 is connected with a drive lever 65. The turbocharger C is provided with an actuator 66 outside the housing (see FIG. 1). The drive lever 65 is connected to the actuator 66. When the actuator 66 drives the drive lever 65, as illustrated in FIG. 2B, the drive lever 65 and the drive shaft 63 swing (rotate) about the axial center of the drive shaft 63. The turning force from the actuator 66 is transmitted to the link plate 61. In this manner, the link plate 61 swings.

Then, the second engagement recessed portion 52 is pressed against the link plate 61 illustrated in FIG. 4. The drive ring 50 rotates. By the rotation of the drive ring 50, the transmission links 60 separately engaged with multiple of the engagement recessed portions 51 are pressed and swing. As the transmission links 60 swing, the plurality of bladed shafts 62a rotates. As the bladed shafts 62a rotate, the angle of the plurality of nozzle vanes 62 is changed within the flow passage x. In this manner, the nozzle drive mechanism 20 is swung by the link plate 61 by the power of the actuator 66. In this manner, the nozzle drive mechanism 20 drives the plurality of nozzle vanes 62. The nozzle drive mechanism 20 changes the angle of the plurality of nozzle vanes 62. The nozzle drive mechanism 20 allows the area of the flow passage x (the flow passage width between adjacent nozzle vanes 62 (so-called nozzle throat width)) to be variable.

Meanwhile, a center hole 33d is provided at the center of the bottom surface portion 33 of the support ring 30 as illustrated in FIG. 2A. The center hole 33d penetrates through the bottom surface portion 33 in the axial direction of the shaft 8.

As illustrated in FIGS. 2A and 2B, an opposing surface 2b is a portion of the bearing housing 2 that faces the bottom surface portion 33 of the support ring 30. On the opposing surface 2b, an annular protrusion 2c is provided. The annular protrusion 2c protrudes toward the turbine impeller 9 side. The shaft 8 (see FIG. 1) is inserted through an inner peripheral side of the annular protrusion 2c. The annular protrusion 2c is inserted through the center hole 33d of the bottom surface portion 33.

The bottom surface portion 33 is formed with a heat shielding portion 33e. The heat shielding portion 33e is continuous radially outward from the center hole 33d of the bottom surface portion 33. The heat shielding portion 33e protrudes in the axial direction of the shaft 8 from a left side surface (turbine impeller 9 side) of the bottom surface portion 33 in FIGS. 2A and 2B. The heat shielding portion 33e is formed to be thicker than an outer portion in the radial direction of the heat shielding portion 33e by an amount protruding in the axial direction of the shaft 8. The protruding portion of the heat shielding portion 33e is a stepped portion. The stepped portion has a side surface facing radially outward. The stepped portion is inserted through the inner peripheral side of the nozzle ring 22. The side surface of the stepped portion faces the inner circumferential surface of the nozzle ring 22.

The heat shielding portion 33e extends to a position facing the turbine impeller 9 in the direction of the rotational axis of the turbine impeller 9 (axial direction of the shaft 8). The heat shielding portion 33e shields the heat from the turbine impeller 9 to the radial bearing 7 side.

By including the heat shielding portion 33e in the support ring 30 in this manner, the number of parts can be reduced as compared with a case where a heat shielding plate is separately provided in addition to the support ring 30. This enables improvement in the workability of assembly.

Furthermore, as described above, the flange portion 32 is clamped between the bearing housing 2 and the turbine housing 4. That is, the flange portion 32 functions as a clamped portion. The clamped portion is clamped between the bearing housing 2 and the turbine housing 4.

Therefore, it is possible to assemble the support ring 30 that functions also as a heat shielding portion by a simple operation of clamping the flange portion 32 between the bearing housing 2 and the turbine housing 4. This enables further improvement in the workability.

Figure 5:
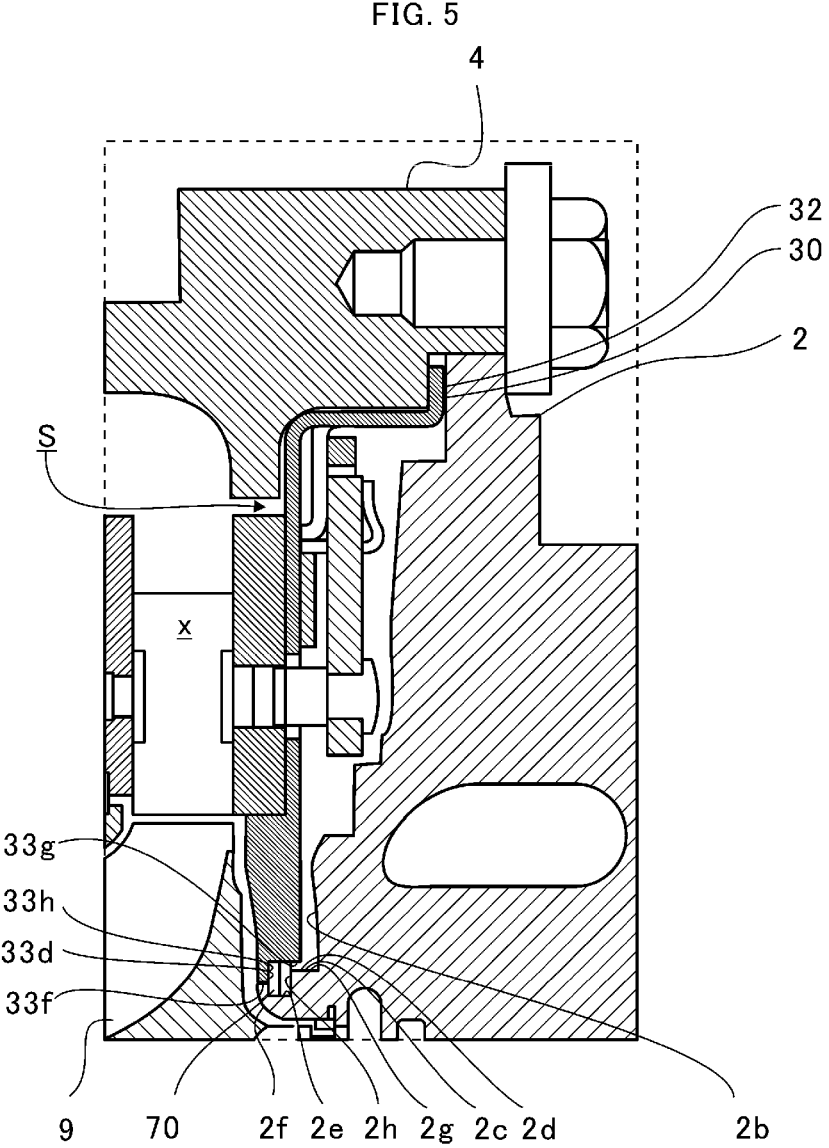
FIG. 5 is a first diagram for explaining a first modification.
Figure 6:
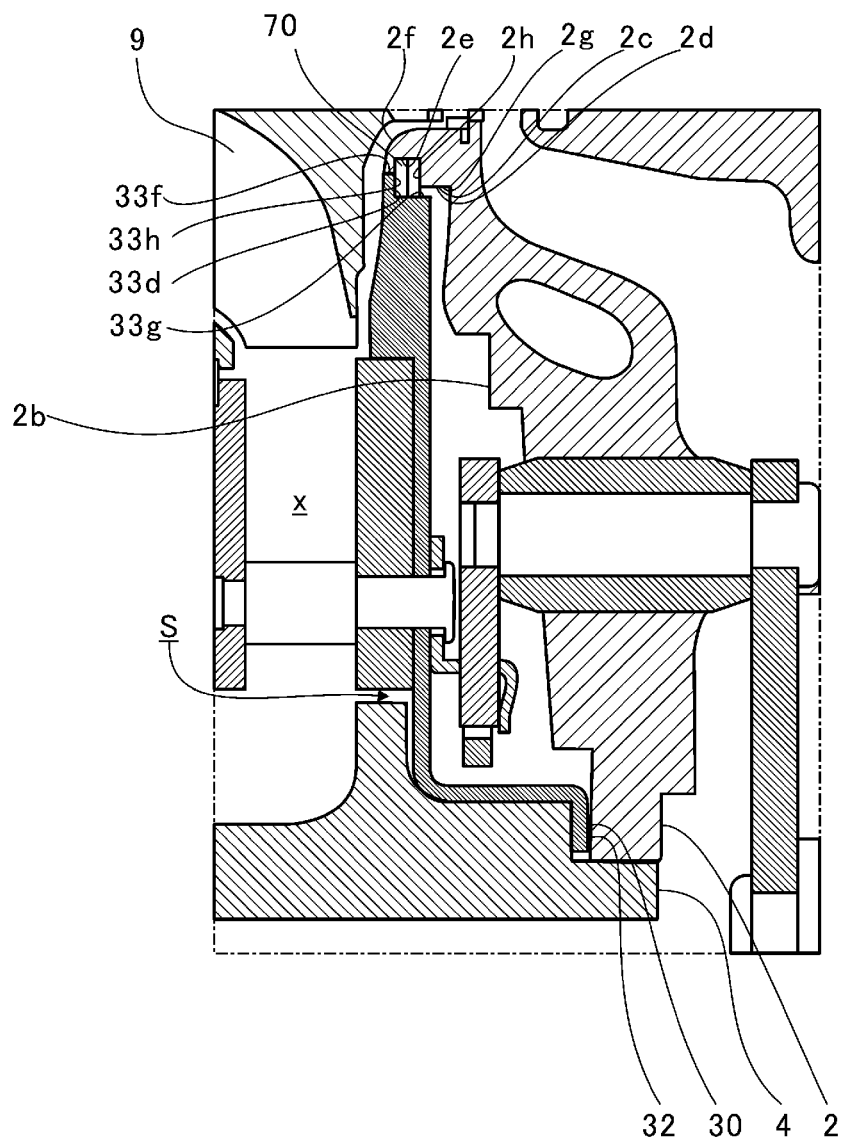
FIG. 6 is a second diagram for explaining the first modification.

FIGS. 5 and 6 are explanatory diagrams for explaining a first modification. In FIG. 5, a cross-sectional view of a position of the first modification corresponding to FIG. 2A is illustrated. In FIG. 5, a cross-sectional view of a position of the first modification corresponding to FIG. 2B is illustrated. In the embodiment described above, the annular protrusion 2c is inserted through the center hole 33d of the bottom surface portion 33 of the support ring 30.

In the first modification, as illustrated in FIGS. 5 and 6, an annular groove 2e is formed on an outer circumferential surface 2d of an annular protrusion 2c. A tip portion 2f is a portion of the annular protrusion 2c on a tip side (left side in FIGS. 5 and 6) with respect to the annular groove 2e. A base portion 2g is a portion of the annular protrusion 2c on the base side (right side in FIGS. 5 and 6) with respect to the annular groove 2e. The tip portion 2f has a smaller diameter than that of the base portion 2g. A stepped surface 2h is formed between the annular groove 2e and the base portion 2g. The stepped surface 2h extends in a radial direction of a shaft 8.

Meanwhile, a center hole 33d of a support ring 30 has a small diameter portion 33f and a large diameter portion 33g. The small diameter portion 33f is formed on a turbine impeller 9 side (left side in FIGS. 5 and 6) of the center hole 33d. The large diameter portion 33g is formed on an opposing surface 2b side (right side in FIGS. 5 and 6) of a bearing housing 2 in the center hole 33d. The small diameter portion 33f has a smaller diameter than that of the large diameter portion 33g. Between the small diameter portion 33f and the large diameter portion 33g, a stepped surface 33h is formed. The stepped surface 33h extends in the radial direction of the shaft 8.

Moreover, the annular groove 2e is fitted with a sealing ring 70. An outer diameter of the sealing ring 70 is slightly larger than an inner diameter of the large diameter portion 33g of the support ring 30 when the sealing ring 70 is in the natural length (before assembly). The sealing ring 70 is press-fitted into the large diameter portion 33g. Furthermore, the sealing ring 70 is provided between the stepped surface 2h of the bearing housing 2 and the stepped surface 33h of the support ring 30.

By the elastic force of the sealing ring 70, an outer circumferential surface of the sealing ring 70 is pressed radially against the large diameter portion 33g. In addition, by the gas pressure during operation, a side surface of the sealing ring 70 is pressed against one of the two stepped surfaces 2h and 33h, thereby enhancing the sealing performance.

Exhaust gas flowed into a turbine scroll flow passage 15 slightly leaks out from a clearance S upstream of a flow passage x toward the support ring 30 side. The leaked exhaust gas may flow through a space formed between the support ring 30 and the bearing housing 2 on the right side in FIGS. 5 and 6 rather than the support ring 30 in some cases. The exhaust gas flowed in may flow out to a rear side of the turbine impeller 9 in some cases. By providing the sealing ring 70, such flow of exhaust gas is suppressed. This enables suppressing deterioration of the turbine efficiency.

Figure 7:
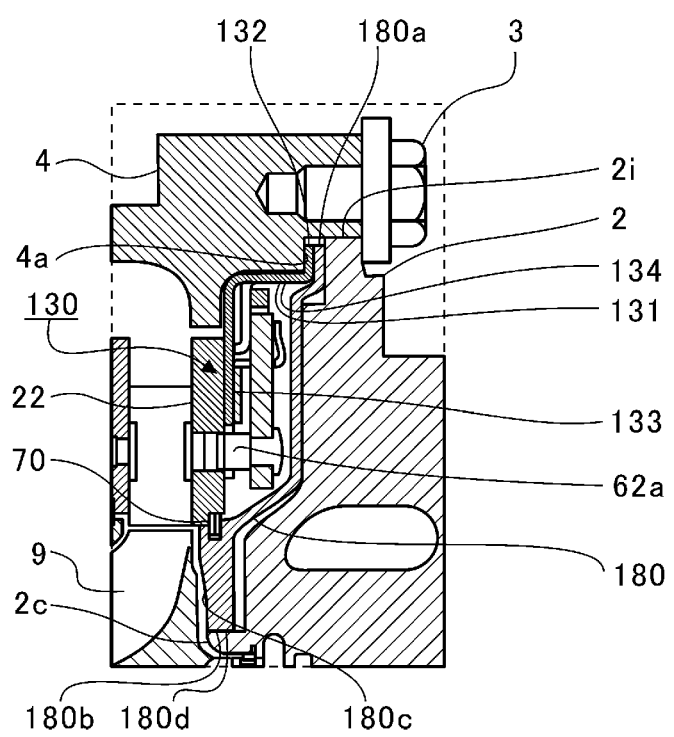
FIG. 7 is an explanatory diagram for explaining a second modification.

FIG. 7 is an explanatory diagram for explaining a second modification. In FIG. 7, a cross-sectional view of a position of the second modification corresponding to FIG. 2A is illustrated. In the embodiment and the first modification described above, the case where the heat shielding portion 33e is formed in the support ring 30 has been described. In the second modification, a heat shielding plate 180 which is a separate body from the support ring 130 is provided.

To describe in detail, a bottom surface portion 133 of a main body portion 131 of a support ring 130 is bent from a cylindrical portion 134. The bottom surface portion 133 extends radially inward from a bladed shaft 62a. An outer diameter end portion 180a of the heat shielding plate 180 extends radially outward to a position facing a flange portion 132 (clamped portion). The outer diameter end portion 180a has the same outer diameter as the outer diameter of the flange portion 132 of the support ring 130, for example. An annular protrusion 2c of a bearing housing 2 is inserted through a center hole 180b of the heat shielding plate 180.

Furthermore, the heat shielding plate 180 extends to a position corresponding to the heat shielding portion 33e of the support ring 30 in the embodiment described above. That is, the heat shielding portion 180c is formed in the heat shielding plate 180. Like the heat shielding portion 33e, the heat shielding portion 180c is inserted into an inner circumferential side of the nozzle ring 22. A sealing ring 70 is arranged on an outer periphery of the heat shielding portion 180c.

In this manner, the heat shielding portion 180c of the heat shielding plate 180 (inner diameter end portion 180d of the heat shielding plate 180) extends to a position facing the turbine impeller 9 in the rotational axis direction of the turbine impeller 9 (axial direction of the shaft 8). The heat shielding portion 180c shields the heat from the turbine impeller 9 to a radial bearing 7 side.

The flange portion 132 of the support ring 130 and the outer diameter end portion 180a of the heat shielding plate 180 are clamped between the turbine housing 4 and the bearing housing 2. The flange portion 132 and the heat shielding plate 180 are clamped between an outer diameter end portion 2i of the bearing housing 2 and an opposing portion 4a of the turbine housing 4 in a stacked state. The opposing portion 4a faces the outer diameter end portion 2i in the axial direction of the shaft 8. Here, the flange portion 132 and the heat shielding plate 180 may be clamped between the outer diameter end portion 2i of the bearing housing 2 and the opposing portion 4a of the turbine housing 4, with a separate member interposed therebetween.

Only by fastening the bearing housing 2 and the turbine housing 4 by the fastening bolt 3, the support ring 130 and the heat shielding plate 180 can be simultaneously held inside the bearing housing 2 and the turbine housing 4. This enables improvement in the workability.

Although the embodiment has been described with reference to the accompanying drawings, it is naturally understood that the present disclosure is not limited to the above embodiments. It is clear that those skilled in the art can conceive various modifications or variations within the scope described in the claims, and it is understood that they are naturally also within the technical scope of the present disclosure.

INDUSTRIAL APPLICABILITY

The present disclosure can be applied to a turbocharger including a nozzle drive mechanism for driving a plurality of nozzle vanes.

What is claimed is:

1. A turbocharger comprising:
a plurality of nozzle vanes, each of the plurality of nozzle vanes provided with one of a plurality of bladed shafts;
a nozzle ring provided with through holes through which the plurality of bladed shafts are inserted, one end of each of the plurality of bladed shafts provided with one of a plurality of transmission links;
a drive ring formed by an annular plate, one end of each of the plurality of transmission links are engaged with an inner peripheral side of the drive ring;
a support ring including
a main body portion holding the nozzle ring and the drive ring,
a heat shielding portion provided on the main body portion, the heat shielding portion including a center hole and facing a turbine impeller in a direction of a rotational axis of the turbine impeller, and
a clamped portion protruding radially outward from the main body portion, and clamped between a turbine housing and a bearing housing;
an annular protrusion provided on the bearing housing, the annular protrusion inserted through the center hole; and
a sealing ring provided between an inner circumferential surface of the center hole and an outer circumferential surface of the annular protrusion.

2. A turbocharger comprising:
a plurality of nozzle vanes, each of the plurality of nozzle vanes provided with one of a plurality of bladed shafts;
a nozzle ring provided with through holes through which the plurality of bladed shafts are inserted, one end of each of the plurality of bladed shafts provided with one of a plurality of transmission links;
a drive ring formed by an annular plate, one end of each of the plurality of transmission links are engaged with an inner peripheral side of the drive ring;

a support ring including
- a main body portion holding the nozzle ring and the drive ring,
- a clamped portion protruding radially outward from the main body portion and clamped between a turbine housing and a bearing housing;

a heat shielding plate, an outer diameter end portion of the heat shielding plate extending to a position facing the clamped portion, the heat shielding plate clamped between the turbine housing and the bearing housing, the heat shielding plate including a heat shielding portion facing a rear surface of a turbine impeller and inserted through the nozzle ring;

a first small diameter portion and a first large diameter portion formed on an outer peripheral surface of the heat shielding portion;

a second small diameter portion formed on an inner peripheral surface of the nozzle ring and radially facing the first small diameter portion, and a second large diameter portion formed on the inner peripheral surface of the nozzle ring and radially facing the first large diameter portion; and a sealing ring provided between the second small diameter portion and the first large diameter portion in a direction of a rotational axis of the turbine impeller.

* * * * *